United States Patent
Adachi et al.

[11] Patent Number: 5,984,414
[45] Date of Patent: Nov. 16, 1999

[54] HEADREST

[75] Inventors: Mitsuhiro Adachi; Makoto Shimada, both of Akishima, Japan

[73] Assignee: Tachi-s Co., Ltd., Tokyo, Japan

[21] Appl. No.: 09/002,023

[22] Filed: Dec. 31, 1997

[51] Int. Cl.[6] .................................................. A47C 7/36
[52] U.S. Cl. ...................... 297/391; 264/46.7; 264/46.9; 264/276; 297/DIG. 1
[58] Field of Search ................................ 264/46.6, 46.7, 264/276, 46.9; 297/391, DIG. 1; 29/527.1, 530

[56] References Cited

U.S. PATENT DOCUMENTS

| | | | |
|---|---|---|---|
| 4,908,170 | 3/1990 | Kurimoto | 264/46.7 |
| 5,004,572 | 4/1991 | Kurimoto | 264/46.6 |
| 5,135,593 | 8/1992 | Quirin | 297/DIG. 1 |
| 5,165,754 | 11/1992 | Louys . | |
| 5,261,726 | 11/1993 | Yanagishita | 297/391 |
| 5,405,190 | 4/1995 | Jeffcoat et al. . | |
| 5,681,087 | 10/1997 | Yamano et al. | 297/391 |
| 5,730,917 | 3/1998 | Ishikawa et al. | 264/276 |
| 5,855,831 | 1/1999 | Takei | 264/46.6 |

FOREIGN PATENT DOCUMENTS

| | | | |
|---|---|---|---|
| 60-24906 | 2/1985 | Japan | 264/46.7 |
| 62-35811 | 2/1987 | Japan | 264/46.6 |
| 9206163 | 8/1987 | Japan . | |
| 63-299908 | 12/1988 | Japan . | |
| 1153183 | 6/1989 | Japan . | |
| 919934 | 1/1997 | Japan . | |

*Primary Examiner*—Allan R. Kuhns
*Attorney, Agent, or Firm*—Browdy and Neimark

[57] ABSTRACT

In forming a donut-like headrest under a foaming process, a sealing garnish element is provided, which includes a garnish portion and an edge abutment portion. Prior to a foaming step, the sealing garnish element is brought to a donut-like trim cover assembly and inserted fit in an annular opening formed in the annular inward wall region of the trim cover assembly, such that the edge portions of the annular opening are abutted against the edge abutment portion of sealing garnish element, while the garnish portion is attached on and along the annular inward wall region of trim cover assembly. Hence, during the foaming step, those edge abutment and garnish portions of sealing garnish element effectively prevents a liquid foaming base material injected in the trim cover assembly, against leakage from the annular opening.

13 Claims, 3 Drawing Sheets

HEADREST

BACKGROUND OF INVENTION

1. Field of the Invention

The present invention relates to a method for forming an headrest for use on an automotive seat by means of a foaming process wherein a liquid base foaming material is injected into within a trim cover assembly of donut-like or tubular ringed shape and cured therein to form a corresponding shape of headrest, and also to the resulting headrest formed by that method.

2. Description of Prior Art

Among various sorts of headrests, there has been known a donut-like or generally tubular ringed shape of headrest having a through-hole formed centrally of and through its body. Typically, forming this headrest is based on a foaming process, using a foaming die device. At an initial step, several separate covering material sections are sewn together to provide a three-dimensional donut-like or generally tubular ringed shape of covering member having an through-hole centrally thereof. Along this covering member, an annular opening portion is defined, which allows entry of a headrest frame with headrest stay portions into within the covering member. Next, the headrest frame is placed in the thus-formed covering member through such annular opening portion, with the headrest stay portions projecting outwardly through another corresponding holes formed in the covering member. Then, as for example disclosed from the Japanese Laid-Open Publication No. 1-153183, a sealing member is secured via plural snapping points to the annular opening portion to close the same, after which, such sealed covering material is placed in a foaming die and subjected to a foaming process. During the foaming operation, the sealing member serves to prevent leakage of the liquid base foaming material from the annular opening portion of covering member.

However, in this sort of conventional method, the material of covering member used is rather soft and unsteady, with the result that a portion of the covering material secured to the foregoing sealing material creates creases or wrinkles therein, which makes incomplete the sealing of the covering member. As a consequence thereof, it has been found defective that, during the foaming process, the liquid base foaming material filled in the sealed covering member is easily leaked from the creased or wrinkled portion of covering material around the sealing member, and an objectionable staining points of cured foaming material appears on the surface of resultant headrest, impairing its outer aesthetic appearance.

SUMMARY OF THE INVENTION

In view of the above-stated drawbacks, it is a primary purpose to provide an improved method for forming a headrest, in which a liquid foaming material is prevented against leakage during a foaming step to produce a resulting headrest with no objectionable appearance.

To achieve such purpose, in accordance with the present invention, there is basically provided the steps of:

providing a trim cover assembly of a donut-like three-dimensional shape which has: a through-hole defined therethrough; an annular inward wall region defined along a peripheral direction of the through-hole; an annular opening formed in and along the annular inward wall region, which annular opening includes an edge portion; and a hole formed at one side thereof;

providing a headrest frame having a headrest stay means;

providing a sealing garnish means of a generally annular configuration conforming generally to the annular inward wall region of trim cover assembly, the sealing garnish means being for closing and sealing the annular opening of trim cover assembly, and comprising a garnish means for attachment on and along the annular inward wall region and an edge abutment means for allowing the edge portion of annular opening to be abutted thereagainst;

inserting the headrest frame through the annular opening into within the trim cover assembly, while projecting the headrest stay means through the hole of trim cover assembly to outside;

thereafter, inserting the edge abutment means of sealing garnish means in the annular opening, while attaching the garnish means of sealing garnish means on and along the annular inward wall region of trim cover assembly, such that the edge portion of annular opening is abutted against the edge abutment means, whereupon an incomplete headrest unit is produced, in which the headrest frame and sealing garnish means are merely set;

then, placing the incomplete headrest unit in a foaming die means;

injecting a liquid base foaming material into within the trim cover assembly; and curing the liquid base foaming material to create a mass of cured foam material within the trim cover assembly.

Accordingly, the liquid base foaming material is prevented against leakage from the annular opening of trim cover assembly, not only owing to the edge portion of annular opening being abutted against the edge abutment means of sealing garnish means, but also owing to the garnish means of sealing garnish means lying on and along a portion of the annular inward wall region adjacent said annular opening, which positively closes and seals the annular opening against the leakage of said liquid base foaming material therethrough.

Preferably, the trim cover assembly includes at least a lamination of a top cover layer and a foam wadding layer in order to use the elastic recovery force of that foam wadding layer to cause the edge portion to be positively abutted against the edge abutment means of sealing garnish means.

As a preferred aspect of the invention, the garnish means is of a generally annular shape for attachment on and along the annular inward wall region of trim cover assembly, with the edge abutment means projecting radially from the garnish means, and the method includes the steps of inserting that edge abutment means into the annular opening, such that the edge portion of annular opening is abutted against the edge abutment means, whereby, at the steps of injecting the liquid base foaming material into the trim cover assembly and curing the same therewithin, the liquid base foaming material is prevented by those garnish means and edge abutment means against leakage from the annular opening. More preferably, the garnish means may be of an inwardly arcuate shape in section, which turns inwardly thereof and has a concave surface for contact on and along the annular inward wall region of trim cover assembly.

Further, the method in the present invention provides its adaptability for use with either a pair of inwardly turned edge portions of the annular opening or a pair of sheer edge portions of the same. In the case of the latter, the edge abutment means may preferably comprise a pair of generally annular recessions formed therealong, and the method includes the step of causing such pair of sheer edge portions to be fit abutted against and along the pair of generally annular recessions, respectively, at the foregoing step of inserting the edge abutment means of sealing garnish means into the annular opening.

In accordance with the invention, in all of the above-stated modes, the garnish means of sealing garnish means may preferably be of an inwardly arcuate shape in section, which turns inwardly thereof, having thus a concave inward surface which will provide more tight and close contact on and along the annular inward wall region of trim cover assembly, so as to assure preventing external leakage of liquid base foaming material from the annular opening and concealing a part of cured base foaming material which might be leaked from between the edge abutment means and annular opening edge portion and cured as an objectionable layer on the surface of trim cover assembly.

It is another purpose of the present invention to provide a headrest formed in accordance with the above-described method.

Other features and advantages of the invention will become apparent from reading of the descriptions hereinafter, with reference to the annexed drawings.

DETAILED DESCRIPTION OF PREFERRED EMBODIMENTS OF THE INVENTION

Through FIGS. 1 through 12, there are illustrated a headrest and a method for forming the same in accordance with the present invention.

Figure 12:
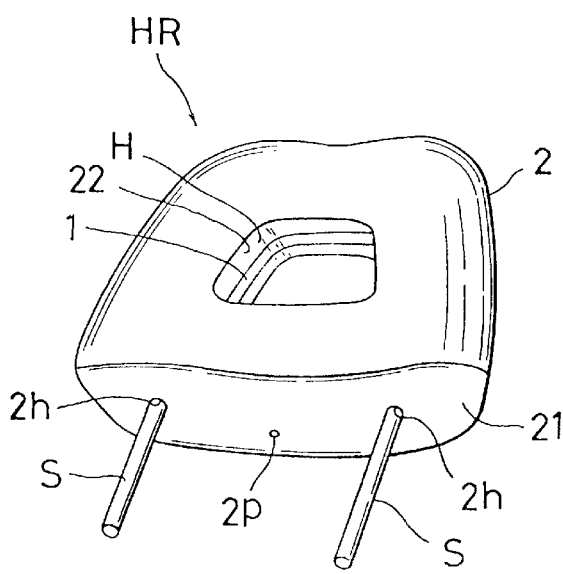
FIG. 12 is a schematic perspective view showing a general outer appearance of headrest attainable for each of the resultant headrests shown in FIGS. 9, 10 and 11.

A resulting headrest formed in the present invention is shown in FIG. 12 at (HR), which has a generally tubular ringed or donut-like three-dimensional configuration with a through-hole (H) defined centrally thereof and also has a pair of headrest stay portions (S)(S) projecting therefrom.

Figure 1:
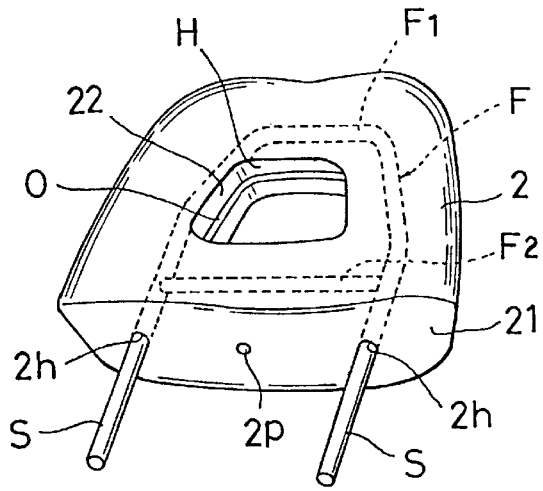
FIG. 1 is schematic perspective view of an incomplete headrest unit to be subjected to a foaming process.
Figure 2:
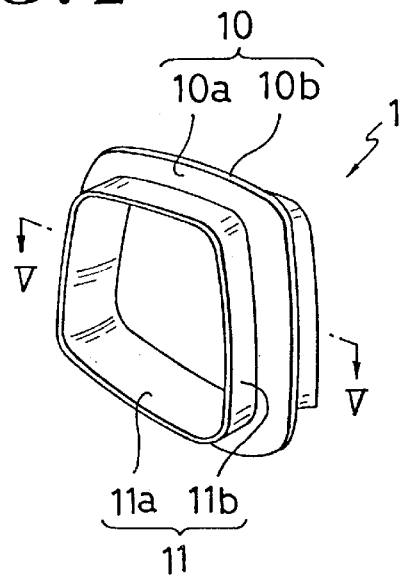
FIG. 2 is a schematic perspective view of a sealing garnish member to be used in accordance with the present invention.

Now, according to the present invention, as shown in FIGS. 1 and 2, there are provided a donut-like three-dimensional shape of trim cover assembly (2), a headrest frame (F), and a sealing garnish member (1). Those elements are subjected to a subsequent foaming process which will be described later.

Figure 3:
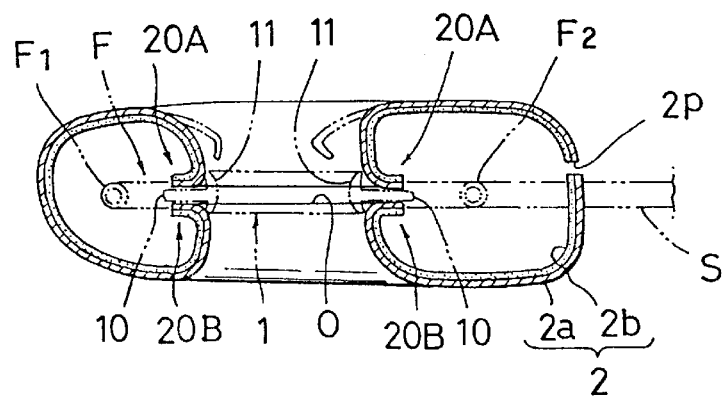
FIG. 3 is a schematic sectional view showing one type of trim cover assembly usable in accordance with the invention.

With particular reference to FIG. 3, the trim cover assembly (2) shown therein is of a two-layer lamination structure comprising a top cover layer (2a) and a foam wadding layer (2b). Though not clearly shown, normally, the trim cover assembly (2) is preformed in the illustrated three-dimensional donut-like shape by sewing together several separate sections of such known two-layer lamination type cover material comprising a top cover layer (2a) and a foam wadding layer (2b) (formed from a slab urethane foam material) in this order. But, the cover material is not limited thereto, but may be of a three-layer lamination type comprising a top cover layer, a foam wadding layer and a back cloth layer as known in the art. According to the present invention, such multi-layer structure of trim cover assembly (C) is employed as one of inventive purposes to be stated later.

Figure 6:
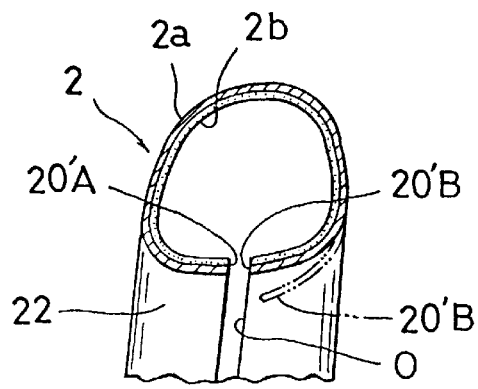
FIG. 6 is a fragmentary sectional view of another type of trim cover assembly usable in the present invention.

Reference is again made to FIG. 1. This trim cover assembly (2) has an annular inward wall region (22) defined along the peripheral direction of the through-hole (H) thereof. An annular opening (0) is formed in and along such annular inward wall region (22) of trim cover assembly (2). Formed in the bottom wall (21) of the trim cover assembly (2) are a pair of openings (2h)(2h) through which the two headrest stay portions (S)(S) are to be passed to the outside, respectively, and an injection hole (2P) through which an injection nozzle (N) (see FIG. 4) is to be inserted into within the trim cover assembly (2), as will be explained later. The headrest trim cover assembly (2) may be formed with a pair of inwardly turned edge portions (20A)(20B) at the annular opening (0) as seen in FIG. 3, or may be formed with a pair of spaced-apart sheer edge portions (20'A)(20'B) at the annular opening (0) as seen in FIG. 6, depending on a design requirement or as may be required due to an accidental difference in size among the cover materials for forming the trim cover assembly (2). Therefore, the gist of the present invention includes adaptability for use of such two non-distinctive different trim cover assemblies normally found in the art, and as will be appreciated, the method in the present invention makes advantageous use of an elastic force commonly inherent in the two different edge portions (20A, 20B) and (20'A, 20'B) in the trim cover assembly (2).

Designation (F) denotes a headrest frame of generally inverted U shape having a curved upper part (F1), the above-stated pair of headrest stays (S) extending continuously from the curved upper part (F1) and a transverse reinforcing rod (F2) extended between those two headrest stay portions (S), as seen in FIG. 1. This headrest frame (F) will form an integral frame within the foregoing trim cover assembly (2) during a headrest forming process to be described.

Taking into account the above-discussed two types of trim cover assemblies (2), in accordance with the present invention, the sealing garnish member (1) is generally depicted in FIGS. 2, 5, 7 and 8 as having a generally annular or ringed configuration which includes an edge abutment means projected radially therefrom, the edge abutment means allowing the two different edge portions (20A, 20B) (20'A, 20'B) to be positively abutted thereagainst, as will be elaborated. This sealing garnish member (1) is used for sealing the annular opening (0) of trim cover assembly during a subsequent foaming process, and also serves as a garnish for aesthetically improving the outer appearance of through-hole area (H) of a resulting headrest. For that purpose, it is within the scope of the present invention to provide three non-distinctive modes of sealing garnish members (1), a first one of them being shown in FIG. 5, and second and third ones of them being shown in FIG. 7 and FIG. 8, respectively. The basic structure of this sealing garnish member (1) includes: a garnish means for aesthetically closing and sealing the annular opening (0); and an edge abutment means for allowing the foregoing two different edge portions (20A, 20B) (20'A, 20'B) of trim cover assembly (2) to be positively abutted thereagainst in order to seal the opening (0) and prevent leakage of a liquid base foaming material therefrom during a foaming process to be described.

Those two essential sealing means of sealing garnish member (1) are embodied in three slightly modified modes permissible within the scope of the present invention, as can be seen from FIG. 2, 5, 7 and 8.

Figure 5:
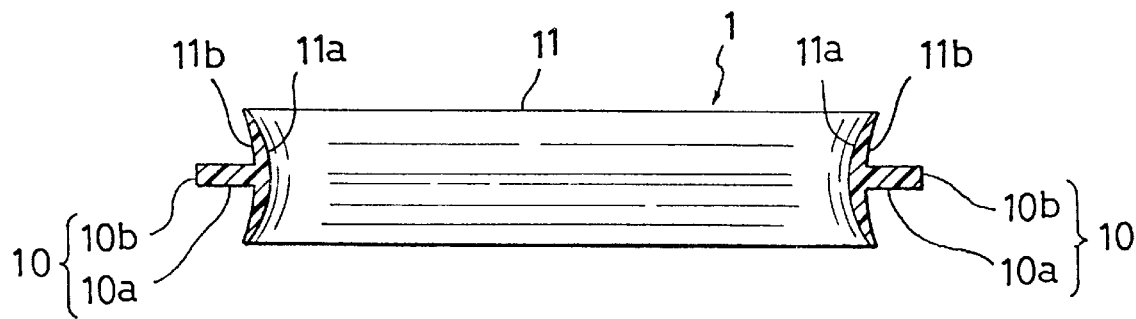
FIG. 5 is a schematic sectional view showing one mode of the sealing garnish member.

Namely, FIGS. 2 and 5 embody the garnish means as a generally tubular or annular garnish body (11) and also embody the edge abutment means as a generally annular edge abutment portion (10) projecting radially and perpendicularly from the outer peripheral surface of the annular garnish body (11). As best shown in FIG. 2, the annular garnish body (11) is of an inwardly arcuate configuration in section, which turns inwardly of the body, and of a size generally corresponding in diameter to the through-hole area (H) of trim cover assembly (2), having an outward convex surface (11a) and an inward concave surface (11b). The edge abutment portion (10) is basically composed of a main edge abutment body (10a) and a free end part (10b). Briefly stated, as understandable from FIGS. 3 and 9, when in use, such edge abutment portion (10) provides an abutment plane against which the two inwardly turned edge portions (20A) (20B) of trim cover assembly (2) are to be abutted in a direction towards each other. Also, the garnish body (11) is attached on and about the annular inward wall region (22) of trim cover assembly (2), with its inward concave surface (11b) lying thereon, such as to close the annular opening (0) as well as a local portion of that annular inward wall region (22) adjacent to the annular opening (0), in an aesthetically improved manner.

Figure 7:
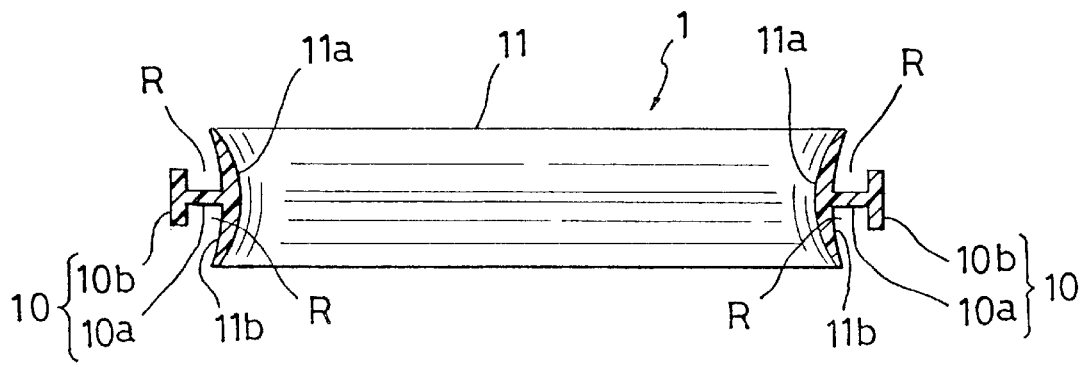
FIG. 7 is a schematic sectional view showing another alternative mode of the sealing garnish member.
Figure 8:
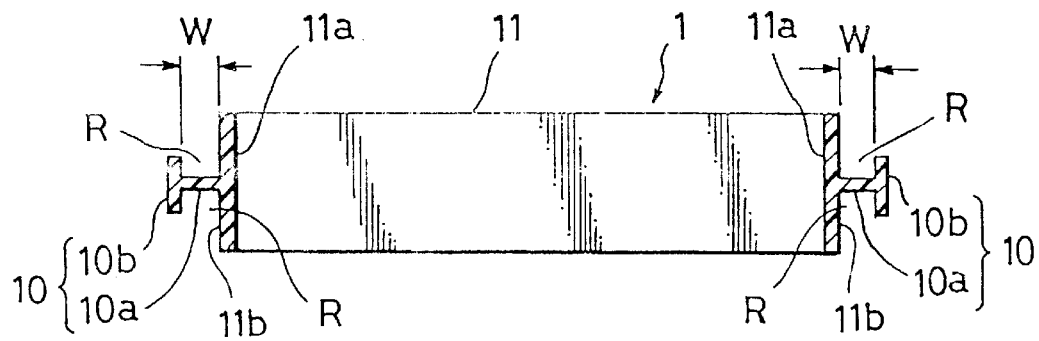
FIG. 8 is a schematic sectional view showing still another alternative mode of the sealing garnish member.

FIGS. 7 and 8 each shows a slightly changed alternative mode of sealing garnish member (1) for allowing a pair of sheer edge portions (20'A)(20'B) of annular opening (0), mentioned earlier, to be abutted thereagainst. According to this mode, as the foregoing edge abutment means, there may be simply formed a pair of generally annular recessions (R)(R) along the main edge abutment body (10a) of the first mode described above, such that they are each defined on the respective opposite side walls of main edge abutment body (10a), as observed in FIGS. 7 and 8. It is understood that those two alternative modes are basically identical in structure to the first mode shown in FIGS. 2 and 5, only excepting the points to be stated below, and therefore all like designations given in the first mode correspond to all like designations to be given in those two another modes, without repetition of same description on the common structures for the sake of simplicity.

As shown in FIG. 7, a pair of generally annular recessions (R)(R) may be defined as the foregoing edge abutment means adaptable for use with the type of trim cover assembly (2) that has a pair of spaced-apart sheer edge portions (20'A) (20'B) as in FIG. 6. The pair of recessions (R)(R) may be formed by cutting out the respective opposite side walls of main edge abutment body (10a) of sealing garnish member (1). A proper depth is given in each of the two recessions (R)(R) enough for allowing the two edge portions (20'A) (20'B) to be fit abutted against and along the respective two recessions (R)(R).

FIG. 8 shows another non-distinctive mode of design with respect to the mode shown in FIG. 7, wherein the annular garnish body (11) of sealing garnish member (1) may be of a shape having a straight wall with a uniform thickness in section, in place of the aforementioned inwardly arcuate sectional configuration as in FIGS. 5 and 7.

All the three sealing garnish members (1) are formed from a synthetic resin material into the illustrated generally annular configuration wherein the edge abutment portion (10) and garnish body (11) are integral with each other. Each sealing garnish member (1) is given a certain rigid property against deformation during the processes to be effected in the present invention.

Now, a description will be made of the method for forming the donut-like headrest, using the above-described sealing garnish means.

As understandable from FIG. 1, at first stage, the headrest frame (F) is inserted into within the trim cover assembly (2) through the annular opening (0), while passing the two stay portions (S)(S) through the respective two holes (2h) (2h) to the outside.

In the case of first mode where the annular opening (0) of trim cover assembly (2) has the pair of inwardly turned end portions (20A)(20B), the sealing annular member (1) of the type shown in FIG. 5 may be used for closing and sealing the annular opening (0) against leakage of a liquid base foaming material therefrom. That is, after the headrest frame (F) having been set in the trim cover assembly (2) as in FIG. 1, a worker should widen the annular opening (0) and insert the edge abutment portion (10) of sealing garnish member (1) in and along that opening (0), as indicated by the two-dot chain lines in FIG. 3, so that both two inwardly turned end portions (20A)(20B) of the opening (0) are each abutted against the respective sides of main edge abutment body (10a) of the edge abutment portion (10). It is appreciated that the two inwardly truned end portions (20A)(20B) tend to pressingly sandwich the main edge abutment body (10a) associated with the sealing garnish member (1) since they are given an elastic recovery force mainly due to the elastic property of foam wadding layer (2b), which efforts to straighten their inwardly turned state into a rectilinear line. This will serve to provide an additional sealing effect to the annular opening (0) during a subsequent foaming process. Now, at the present stage, an incomplete headrest unit is assembled, in which are merely attached the headrest frame (F) and sealing garnish member (1), as can be seen from the solid and phantom lines in FIG. 3.

Figure 4:
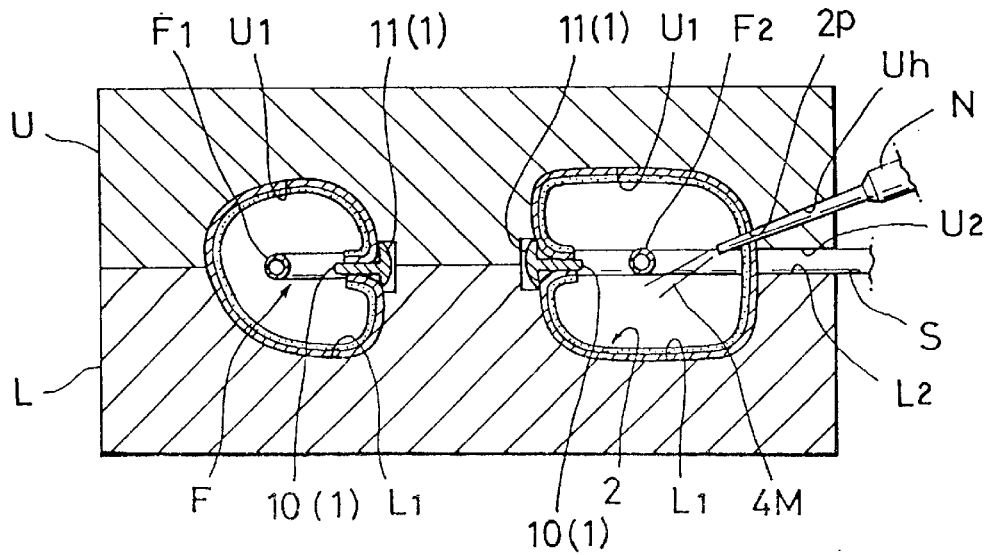
FIG. 4 is a schematic sectional view of a foaming die apparatus, which explanatorily shows the state where the incomplete headrest unit is secured in the foaming die apparatus and a liquid foaming material is injected into the incomplete headrest unit.

Next, in order to subject the incomplete headrest unit to a foaming process, there is provided a foaming die apparatus as shown in FIG. 4, which is known in the art and basically comprises an upper die member (U), a lower die member (L) and an injection nozzle (N) for injecting a liquid base foaming material. The upper and lower die members (U)(L) each has their respective foaming die surfaces (U1)(L1) generally conforming to the whole contour of the trim over assembly (2), and their respective headrest stay retaining recessed areas (U2)(L2) for retaining the headrest stays (S)

therebetween. Designation (Uh) denotes a nozzle insertion hole through which the injection nozzle (N) may be inserted for access into within the trim cover assembly (2) to be set in the die members (U)(L).

Figure 9:
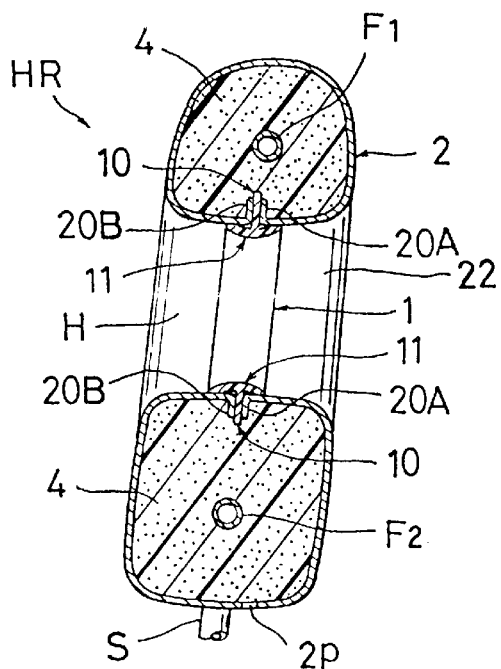
FIG. 9 shows, in section, a resultant headrest formed in accordance with the invention, which uses the foregoing one mode of sealing garnish member.

As shown in FIG. 4, the incomplete headrest unit is placed and secured between the die surfaces (U1, L1) of the upper and lower dies (U)(L), with the headrest stays (S) being securely placed in the retaining areas (U2)(L2) of the same dies. Then, the injection nozzle (N) is inserted through both nozzle insertion holes (Uh)(2P) respectively of the upper die member (U) and trim cover assembly (2) and projected within the trim cover assembly (2). A base foaming material in liquid is injected from the nozzle (N) as indicated at (4M), and thereafter, cured and swollen in the trim cover assembly (2) into a foam cushion body (see (4) in FIG. 9). It is appreciated that, during this foaming process, both inwardly turned edge portions (20A)(20B) associated with the trim cover assembly (2) are resiliently abutted against the edge abutment portion (10) of sealing garnish member (1), thereby providing a preliminary closing effect to the annular opening (0), which assists in preventing the liquid foaming base material (4M) from invasion into the opening (0), and that further, the liquid base material (4M), as it is cured, increases its mass to resiliently press both two inwardly edge portions (20A)(20B) against the edge abutment portion (10), whereby the annular opening (0) is positively closed enough to prevent leakage of the base material (4M) therefrom. Furthermore, even if the liquid material is leaked from between the edge portions (20A)(20B) and edge abutment portion (10), the arcuate cross-section of garnish body (11) serves to positively contact the inward annular wall region (22) of trim cover assembly (2), providing thus a complete sealing against external leakage of the liquid base material (4M) from the annular opening (0) of trim cover assembly (2). Subsequent to this foaming process, there is produced a complete headrest unit (HR) as shown in FIG. 12. FIG. 9 shows the longitudinal section of the resultant headrest (HR), wherein it is observed that the annular opening (0) is closed tight and sealed by the sealing garnish member (1) in an optimal manner to avoid external leakage and expansion of the foam material (4) from the trim cover assembly (2) through the opening (0).

On the other hand, when using the trim cover assembly (2) with such sheer edge portions (20'A) (20'B) at the annular opening (0) as shown in FIG. 6, it may be preferred to use one of the second and third alternative sealing garnish members (1) which are shown in FIGS. 7 and 8.

Figure 10:
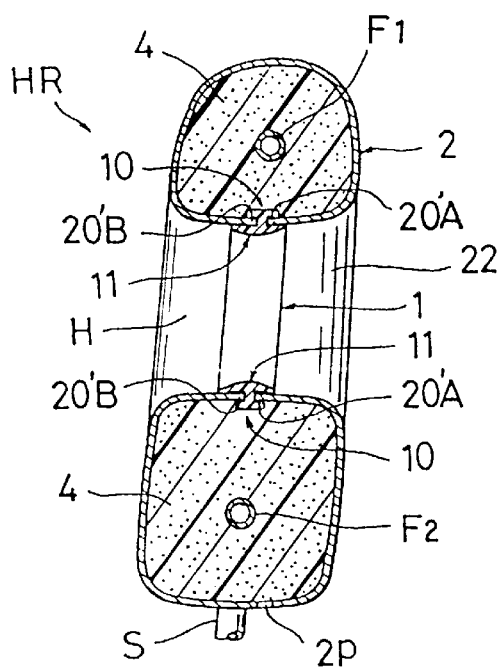
FIG. 10 shows, in section, a resultant headrest formed in accordance with the invention, which uses the foregoing another mode of sealing garnish member.
Figure 11:
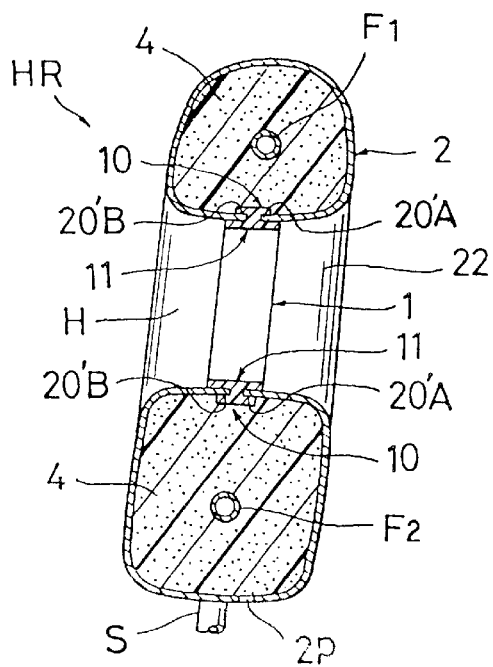
FIG. 11 shows, in section, a resultant headrest formed in accordance with the invention, which uses the foregoing still another mode of sealing garnish member.

With regard to the second sealing garnish member (1), in practice, a worker takes this particular sealing garnish member (1) to the through-hole (H) of trim cover assembly (2), after having placed the headrest frame (F) in the trim cover assembly (2) as in FIG. 3, then widens the annular opening (0) of the same trim cover assembly (2), and introduces the two sheer edge portions (20'A) (20'B) into and along the two annular recessions (R)(R) of the sealing garnish member (1), respectively, so that those particular edge portions (20'A) (20'B) are resiliently abutted against and along the main edge abutment body (10a) associated with the sealing garnish member (1). Then, subsequent foaming processes are effected, using the same foaming die apparatus as shown in FIG. 4, in the same steps described earlier, to produce such resulting headrest (HR) as shown in FIG. 12. FIG. 10 shows a longitudinal section of the resulting headrest (HR) formed in this particular mode. It is appreciated likewise in the first mode that the elastic recovery property of foam wadding layer (2b) tends to press both edge portions (20'A) (20'B) against the main edge abutment body (10a) of edge abutment portion (10), thereby assisting in the tight closing of the annular opening (0) and preventing leakage of liquid base foaming material (4M) from the annular opening (0), and that even if the liquid material is leaked from between the edge portions (20A)(20B) and edge abutment portion (10), the inward concave surface (11b) of garnish body (11) closely contacts the inward annular wall region (22) of trim cover assembly (2), providing thus a complete sealing against external leakage of the liquid base material (4M) from the annular opening (0) of trim cover assembly (2). In order to more assure that effect, it is preferred to give a proper thickness in the edge abutment portion (10a), enough to make more repercussive the foam wadding layer (2b) of the edge portions (20'A) (20'B) which contact both sides of the main edge abutment body (10a), so as to not only close tight the annular opening (0), but also forcibly bring the local part of trim cover assembly (2) adjacent the edge portions (20'A) (20'B) into a pressing contact with the inward concave surface (11b) of garnish body (11). It can be seen from FIG. 10 that the sealing garnish member (1) in this second mode also insures to provide a dual sealing effect to the annular opening (0) of trim cover assembly (2) against external leakage of liquid base foaming material from the opening (0) during foaming process and thus against partial external expansion of resulting foam cushion body (4) through the same opening (0).

With regard to the third sealing garnish member (1) shown in FIG. 8, its basic formation is identical to that of the foregoing second sealing garnish member, only except that the annular garnish body (11) thereof is of a normal tubular shape in section having a straight uniform thickness in contrast to the inwardly arcuate shape in section of the annular garnish bodies of the previously described first and second sealing garnish members (1). This mode also has a pair of generally annular recessions (R)(R) as likewise in the second mode shown in FIG. 7 and is applicable to the type of trim cover assembly (2) having two sheer edge portions (20'A)(20'B) at the annular opening (0) thereof as in FIG. 6. Hence, at the first step of assembling an incomplete headrest unit as indicated in FIGS. 1 and 3, the two sheer edge portions (20'A)(20'B) of trim cover assembly (2) may be introduced into the respective two recessions (R)(R) of sealing garnish member (1), and thus abutted against and along both sides of main edge abutment body (10a) associated with the same sealing garnish member (1). Then, all subsequent foaming processes are effected in the same manner as previously described in both first and second modes, just as understandable from FIG. 3, and repetition of same description thereon is deleted for the sake of simplicity. It is noted that the present third mode of sealing garnish member (1) is a mere choice of design with regard to the second mode shown in FIG. 7, since the same dual sealing effect as discussed earlier in the second mode is also attainable from this particular third mode. That is, the elastic recovery property of foam wadding layer (2b) keeps the two edge portions (20'A)(20'B) in a pressing contact with the main edge abutment body (10a) of sealing garnish member (1) to provide a preliminary sealing effect against leakage of liquid base foaming material (4M) from the annular opening (0), and further during the foaming process, the local part of trim cover assembly (2) adjacent the edge portions (20'A) (20'B) are biased into a close contact with the inward surface (11b) of garnish body (11) by the increased mass of base foaming material being cured, which insures to prevent external leakage of the base material even if it is leaked from between the sheer edge portion (20'A or 20'B) and sealing garnish member edge abutment portion (10). In the present third mode, to make more positive that leakage prevention effect, it is preferred to extend the end (10b) of edge abutment portion (10) along a plane parallel with and to a generally same length with the garnish body (11) to reinforce the sealing effect against leakage of the liquid base foaming material (4M) during the foaming process. Also, preferably, the two recessions (R)(R) may be reduced more slightly in width (w) to provide an increased tight contact between the edge portions (20'A) (20'B) of annular opening (0) and the recessions (R), thereby enhancing the sealing effect.

As appreciated from the descriptions, the three modes of sealing garnish member (1) are equivalent to one another in structure and function during the process for forming the headrest (HR), and they have in common the following advantageous effects:

(i) The two edge portions of annular opening (0) are resiliently abutted against and along the edge abutment means (10) of sealing garnish member (1) in an optimum state, depending on whether they are the inwardly turned edge portions (20A, 20B) or the sheer edge portions (20'A) (20'B), so as to provide a sealing effect against leakage of liquid base foaming material (4M) from the annular opening (0). Further, both two edge portions (20A, 20B) or (20'A, 20'B) are positively supported by the edge abutment means (10) and thus prevented against any deformation due to a pressure applied thereto from the liquid base foaming material (4M). This effectively avoids forming any accidental clearance between the annular opening (0) and edge abutment means (10), thereby insuring to attain the sealing effect.

(ii) The garnish means (11) of sealing garnish member lies on and along the portion of annular inward wall region (22) adjacent the annular opening (0), in a pressing contact thereon. Hence, even if a part of the liquid base foaming material is leaked from between the edge portions (20A, 20B or 20'A, 20'B) and edge abutment means (10), and cured as an objectionable layer on that portion of annular inward wall region (22) adjacent the annular opening (0), the sealing garnish means (11) will act to conceal such objectionable cured layer portion of base material and thus maintain an aesthetic appearance of the through-hole area of headrest.

(iii) The sealing garnish member (1) is made of a synthetic resin material available at low cost, and may be easily formed in an integral way into each of the illustrated modes. The total costs in forming the headrest can be reduced to a lowest possible amount.

While having described the present invention thus far, it should be understood that the invention is not limited to the illustrated modes and embodiments, but any other modifications, replacements and additions may be applied thereto structurally and methodologically without departing from the scopes of the appended claims.

What is claimed is:

1. A headrest comprising:
    a trim cover assembly of a donut-like three-dimensional shape having a through-hole defined generally centrally thereof, an annular inward wall region defined along a peripheral direction of said through-hole, an annular opening formed in and along said annular inward wall region, said annular opening including an edge portion, and a hole formed at one side thereof;
    a headrest frame having a headrest stay means;
    said headrest frame being inserted via said annular opening and placed in said trim cover assembly, with the headrest stay means thereof projecting via said hole of the trim cover assembly to outside;
    a sealing garnish means of a generally annular configuration conforming generally to said annular wall region of said trim cover assembly, said sealing garnish means comprising a garnish means for attachment on and along an outer surface of said annular inward wall region and an edge abutment means for allowing said edge portion of said annular opening to be abutted thereagainst;
    said sealing garnish means being so attached on and along the annular inward wall region that the edge abutment means thereof is inserted in said annular opening of the trim cover assembly, while the garnish means thereof is attached on and along an outer surface of said annular inward wall region, thereby closing and sealing the annular opening; and
    a foam material filled in said trim cover assembly on which said sealing garnish means are attached, together with said headrest frame, wherein said edge portion of the annular opening is abutted against said edge abutment means of the sealing garnish means, preventing leakage of a liquid state of the foam material from the annular opening of the trim cover assembly during a foaming process, and wherein said garnish means of the sealing-garnish means lies on and along (the outer surface of) a portion of the annular inward wall region adjacent said annular opening, thereby positively closing and sealing said annular opening.

2. The headrest according to claim 1, wherein said trim cover assembly includes at least a lamination of a top cover layer and a foam wadding layer.

3. The headrest according to claim 1, wherein said garnish means of said sealing garnish means is of a generally annular shape for attachment on and along (the outer surface of) said annular inward wall region of said trim cover assembly, and wherein said edge abutment means of said sealing garnish means projects radially from said garnish means.

4. The headrest according to claim 3, wherein said garnish means of said sealing garnish means is of an inwardly arcuate shape in section, which turns inwardly thereof and has a concave surface for contact on and along said annular inward wall region of trim cover assembly.

5. The headrest according to claim 4, where said sealing garnish means comprises a sealing garnish member made from a synthetic resin material having a certain rigid property against deformation due to a pressure from said foam material, wherein said sealing garnish means comprises a garnish body of a generally annular shape having a width for attachment on and along (the outer surface of) a portion of said annular inward wall region adjacent said annular opening, and wherein said edge abutment means comprises a generally annular edge abutment portion projecting radially and integrally from said garnish body.

6. The headrest according to claim 1, wherein said edge portion is a pair of inwardly turned edge portions extending from said annular opening into within said trim cover assembly, and wherein said pair of inwardly turned edge portions are each abutted against and along respective sides of said edge abutment means of the sealing garnish means.

7. The headrest according to claim 6, wherein said edge abutment means projects radially from said garnish means in a generally annular shape.

8. The headrest according to claim 6, wherein said garnish means of said sealing garnish means is of an inwardly arcuate shape in section, which turns inwardly thereof and has a concave surface for contact on and along (the outer surface of) said annular inward wall region of trim cover assembly, wherein said pair of inwardly turned edge portions are each abutted against and along respective sides of said edge abutment means, while said concave surface of said garnish means is contacted on and along (the outer surface of) said annular inward wall region of trim cover assembly.

9. The headrest according to claim 8, wherein said edge abutment means projects radially from said garnish means in a generally annular shape.

10. The headrest according to claim 6, wherein said edge portion is a pair of sheer edge portions defined in said annular opening of said trim cover assembly, and wherein said pair of sheer edge portions are each abutted against and along respective sides of said edge abutment means of said sealing garnish means.

11. The headrest according to claim 10, wherein said edge abutment means projects radially from said garnish means in a generally annular shape.

12. The headrest according to claim 6, wherein said edge portion is a pair of sheer edge portions defined in said annular opening of said trim cover assembly, wherein said garnish means of said sealing garnish means is of an inwardly arcuate shape in section, which turns inwardly thereof and has a concave surface for contact on and along (the outer surface of) said annular inward wall region of trim cover assembly, and wherein said pair of sheer edge portions are each abutted against and along respective sides of said generally annular edge abutment means of the sealing garnish means, while said concave surface of said garnish means is contacted on and along (the outer surface of) said annular inward wall region of trim cover assembly.

13. The headrest according to claim 10, wherein said generally annular abutment means comprises a pair of generally annular recessions formed therealong, and wherein said pair of sheer edge portions are abutted and against said pair of generally annular recessions, respectively.

\* \* \* \* \*